United States Patent [19]

Sasanuma et al.

[11] Patent Number: 5,937,087
[45] Date of Patent: *Aug. 10, 1999

[54] IMAGE PROCESSING APPARATUS AND METHOD THEREOF

[75] Inventors: Nobuatsu Sasanuma, Yokohama; Tatsuo Takeuchi, Kawasaki; Rie Saito, Yokohama; Yuichi Ikeda, Tokyo, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/508,259

[22] Filed: Jul. 27, 1995

[30] Foreign Application Priority Data

Jul. 29, 1994 [JP] Japan ................................ 6-178127

[51] Int. Cl.$^6$ ................................ H04N 1/46; G03F 3/08
[52] U.S. Cl. ........................ 382/167; 358/506; 358/518; 358/529
[58] Field of Search .................... 358/529, 500, 358/501, 506, 518, 521, 296, 487; 382/162, 167

[56] References Cited

U.S. PATENT DOCUMENTS

| | | | |
|---|---|---|---|
| 4,481,542 | 11/1984 | Goldberg | 358/331 |
| 4,551,751 | 11/1985 | Jung | 358/75 |
| 4,642,681 | 2/1987 | Ikeda | 358/79 |
| 4,734,762 | 3/1988 | Aoki et al. | 358/80 |
| 4,847,654 | 7/1989 | Honma et al. | 358/300 |
| 4,873,570 | 10/1989 | Suzuki et al. | 358/80 |
| 4,982,277 | 1/1991 | Katoh et al. | 358/80 |
| 5,084,758 | 1/1992 | Danzuka et al. | 358/296 |
| 5,138,443 | 8/1992 | Ikeda et al. | 358/80 |
| 5,194,945 | 3/1993 | Kadowaki et al. | 358/75 |
| 5,267,031 | 11/1993 | Kotoh et al. | 358/527 |
| 5,331,440 | 7/1994 | Kita et al. | 358/529 |
| 5,383,055 | 1/1995 | Sasanuma et al. | 358/521 |
| 5,386,305 | 1/1995 | Usami | 358/518 |
| 5,557,428 | 9/1996 | Watanabe | 358/501 |
| 5,563,725 | 10/1996 | Kumada et al. | 358/518 |

FOREIGN PATENT DOCUMENTS

| | | |
|---|---|---|
| 0091501 | 10/1983 | European Pat. Off. . |
| 0267566 | 5/1988 | European Pat. Off. . |
| 2050751 | 1/1981 | United Kingdom . |

Primary Examiner—Kim Yen Vu
Assistant Examiner—Kimberly A. Williams
Attorney, Agent, or Firm—Fitzpatrick, Cella, Harper & Scinto

[57] ABSTRACT

An image having suitable color-tone and density is formed on a recording medium so that a full-color image of an excellent color-tone depending on a OHP can be projected, wherein a CCD separates colors of an original image to read it for converting into a RGB digital signal by an A/D conversion circuit, the process corresponding to a required image signal forming condition is executed by image process means for the digital signal to generate an image signal for outputting it to an LD driver, and a full-color image forming apparatus for forming a color image on a recording medium utilizing plural kinds of color materials based on the image signal comprises the image processing means for executing a gradation conversion process for the signals of C, M and Y in a LUT 1 circuit and executing a different gradation conversion process for a black signal Bk in a LUT 2 circuit different from a LUT 1 circuit.

11 Claims, 11 Drawing Sheets

IMAGE PROCESSING APPARATUS AND METHOD THEREOF

BACKGROUND OF THE INVENTION

1. Field of the Invention

The present invention relates to a color image processing apparatus and method for color processing images.

2. Related Background Art

Hitherto, a method for projecting images on a screen or the like by utilizing an image projector such as an overhead projector (hereinafter referred to as OHP) by forming images on a transparent sheet by a full-color image forming apparatus which depends on such methods as an electrophotography, an ink-jetting, a thermotransfer recording and the like has been widely used and an importance thereof will become more serious in future.

As an OHP image sheet, a resin sheet such as an polyethylene (PET) or the like having a thickness of 100 to 150 $\mu$m is widely used and a desired recorded image holding layer is provided on the resin sheet if it is required in order to improve a fixing, a holding or a resolution of images.

An image forming method which depends on the full-color image forming apparatus utilizing an electrophotographic method will be described hereinafter.

Figure 2:
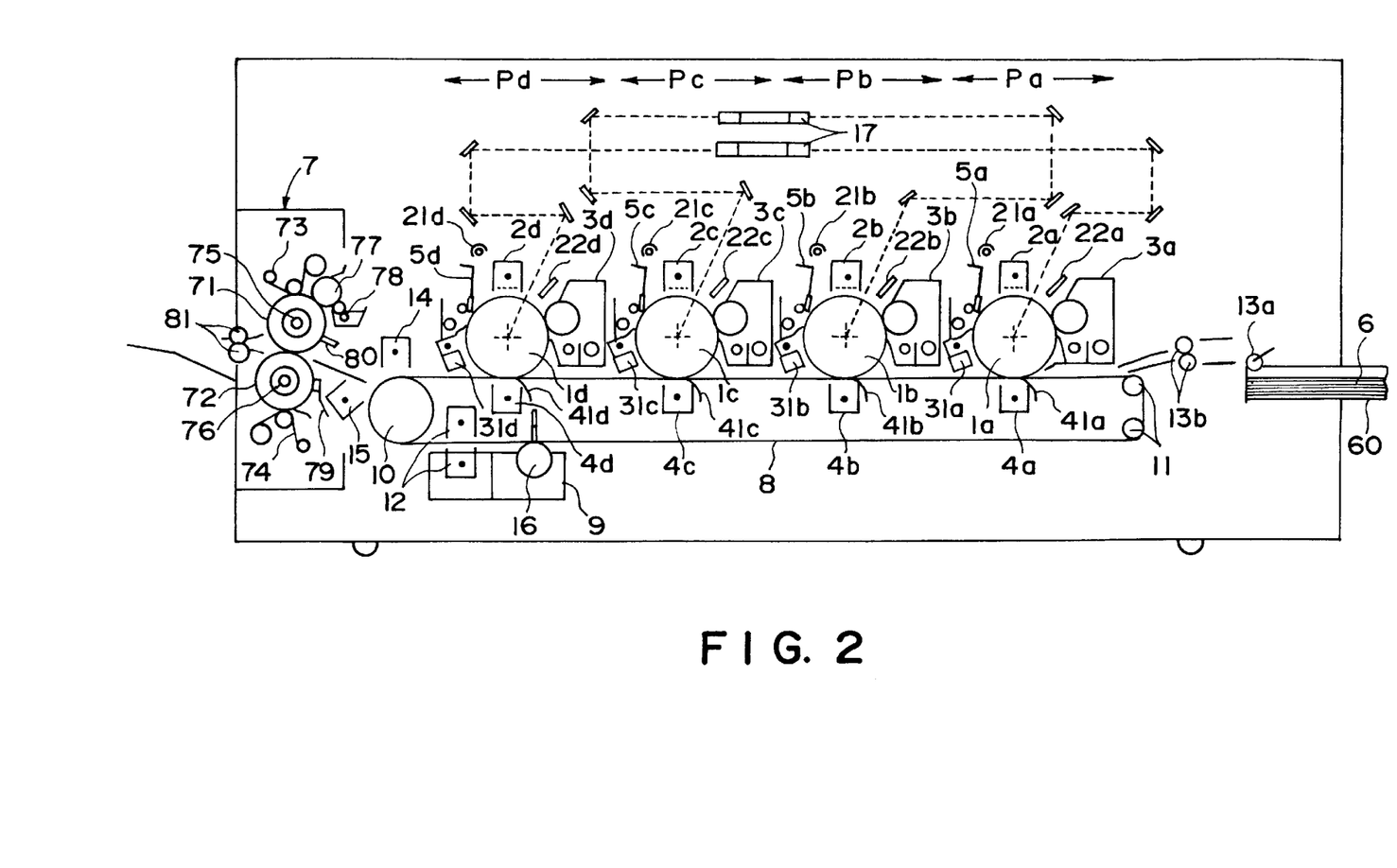
FIG. 2 shows a structural example of a full-color image forming apparatus.

FIG. 2 is a structural view of the full-color image forming apparatus utilizing the electrophotographic method.

In the drawing, the apparatus consists of four stations for forming four color images of magenta, cyan, yellow and black. Photosensitive drums 1a to 1d are uniformly charged by primary chargers 2a to 2d and a light emitted by a semiconductor laser (not shown) driven by each color image signal is exposure scanned on the photosensitive drums 1a to 1d by a polygon mirror 17 to form a latent image. The latent image is developed by development devices 3a to 3d to form a toner image on the photosensitive drums 1a to 1d.

The toner image is formed by applying a recording material 6 in a recording material tray 60 on a transfer belt (or a transfer sheet) 8 through a pick-up roller 13a and registration rollers 13b and is then fed. A registration on the recording material 6 is synchronized. The image is thereafter multiple-transferred by thermotransfer chargers 4a to 4d, and is discharged outside an image forming apparatus upon fixing it on the recording material through a fixing roller 71 and a pressing roller 72 by means of a separation charger 14 and curvature of a transfer belt holding roller 10.

Next, there will be explained as to a fixing process.

The fixing roller 71 consists of a metallic pipe of which surface is coated by a silicone rubber and a fluoro rubber. The pressing roller 72 consists of a metallic roller of which surface is coated by the silicone rubber. A thermistor 79 and a thermocontrol circuit (not shown) both mounted on a surface of the pressing roller 72 control halogen heaters 75 and 76, so that a surface temperature of the roller 72 is maintained at a constant value suitable for the fixing process.

The silicone oil in an oil pool is removed to an oil application roller 77 through an oil pump-up roller 78 for sequentially controlling the oil application roller 77 to contact with or separate from the fixing roller 71. Thus, a constant quantity of oil is to be held on the fixing roller 71 by an oil control blade 80.

Cleaning devices 73 and 74 utilize zonal cleaning web members to attain an excellent cleaning with maintaining their fresh surfaces by drawing out and rolling up the web members.

In case of forming a full-color image on a transparent recording material, it is preferable to increase a fixing set temperature, to decrease a fixing feed speed or to increase a fixing pressure, as compared with a case of fixing a reflect recording material. This is because the sufficient heat is added so as not to remain the grain form of each color toner in the recorded image holding layer on a PET sheet. In order to realize such an operation, a means for delaying the fixing feed speed is generally used under a consideration of a waiting time for switching with the reflect recording material and a structural arrangement of the hardware.

However, if the fixing speed is set suitably for the transparent recording material, it is appeared an area at which a pulse motor cannot uniformly be driven. Further, since heat to be given to a PET sheet becomes unexpectedly large, the transparent recording sheet passes through feed rollers 81 in a thermoplastic state after passing through the fixing roller 71. As a result, there occurs such a defect as the surface of a transparent recording sheet becomes worse.

It should be noted that, since probability that the fused toner adheres to the fixing roller becomes large in an area where a great deal of toner is transferred at a high concentration (or density) area of an image, there occurs such an image defect as the density of the high concentration area becomes thin. Moreover, the transparent recording sheet becomes likely to entwine around the fixing roller because of the tackiness of the fused toner. If the sheet entwines around the fixing roller, a serious damage will be occurred in an image forming apparatus.

SUMMARY OF THE INVENTION

The present invention is applied in consideration of the above-mentioned problems, and an object is to execute a color correction of the image data such that an excellent image can be formed.

Another object of the present invention is to execute a preferable color correction in accordance with a recording medium.

Still another object of the present invention is to execute a preferable color correction in accordance with the kind of a projector.

In order to attain the foregoing objects, an image processing apparatus of the present invention comprises: input means for inputting color image data consisted of plural color components, color correction means for correcting color so as to limit an output level for a predetermined color component in order to reduce the recording material quantity on forming an image and output means for outputting color image data which is color corrected.

DETAILED DESCRIPTION OF THE PREFERRED EMBODIMENTS

Embodiments of the present invention will be described with reference to a full-color image forming apparatus which can form a full-color image not only on an ordinary opaque sheet but also on a transparent recording medium used for an OHP.

The full-color image forming apparatus of the present invention reads an original image with performing a color separation to digitalize a read signal. An obtained digital signal is processed in accordance with a necessary image signal forming condition and then output, so that a color image is formed on a recording medium by several color materials on the basis of the output image signal. Thus, constituted full-color image forming apparatus has almost the same structure as that described in FIG. 2. The present embodiments are characterized in generating and processing an image signal for forming a full-color image on a transparent recording medium used for the OHP. The above featured structural portions of the embodiments will be described hereinafter.

First Embodiment

An embodiment of the present invention will be described in detail hereinafter with reference to the accompanying drawings.

Figure 1:
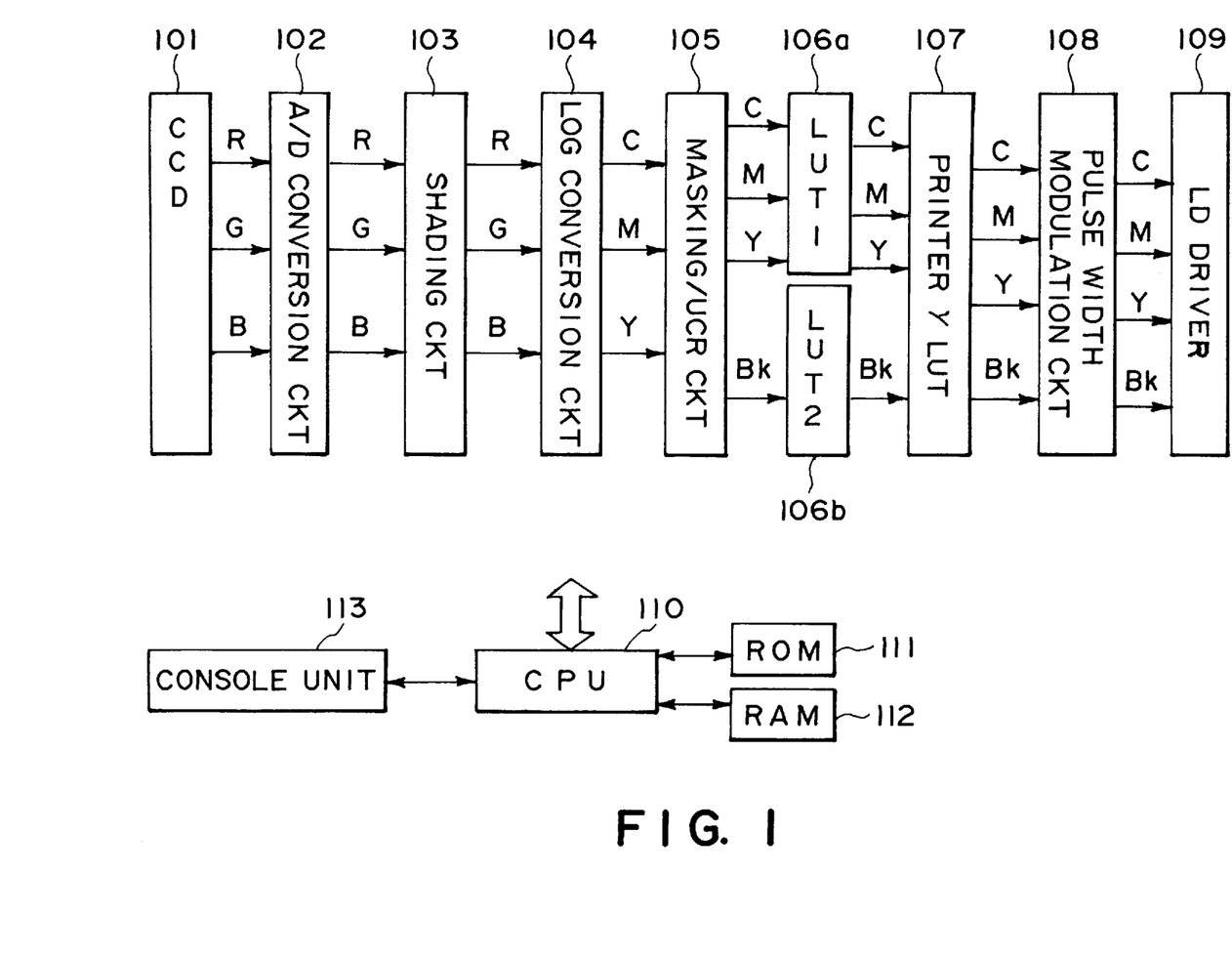
FIG. 1 is a block diagram showing a structural example of an image forming apparatus according to the first embodiment.

FIG. 1 is a block diagram showing an entire structure from a charged coupled device (CCD) 101 to an LD driver 109 which drives a semiconductor laser of the present embodiment.

An original is lighted by a light source (not shown) and an obtained reflected light is focused on the CCD 101 by an optical lens system, thereby converting it into an electrical signal. Thus, image data indicating the original is generated.

The CCD 101 has a shape in which a three-line array is arranged. Color separating filters of red (R), green (G) and blue (B) are coated on a surface of the CCD element every one line, and a color signal corresponding to each color component of one pixel is generated.

The analog image data is converted by an analog-to-digital (A/D) converter 102 into 8-bit digital signal. Then, the obtained digital is normalized, on the basis of a luminance signal, by a shading circuit 103, so as to eliminate variation among elements of the CCD 101.

By a log conversion circuit 104, R, G and B luminance signals are then converted into cyan (C), magenta (M) and yellow (Y) density signals of which colors of C, M and Y are respectively complementary colors of R, G and B.

Next, a masking process for matching color reproductivity and an under color removal (UCR) process for generating a black (Bk) signal are executed in a masking/UCR circuit 105.

For the C, M and Y density signals indicating chromatic color components, a gradation conversion process is executed in a look-up table (LUT)1 circuit 106a. On the other hand, for the black (Bk) signal indicating achromatic color component, a gradation conversion process is executed in a LUT 2 circuit 106b.

It should be noted that a gradation conversion corresponding to a mode (normal mode or transparent recording medium mode) set in a console unit 113 is set by a CPU 110, in the LUT 1 circuit 106a and the LUT 2 circuit 106b.

For the C, M and Y density signals which have been gradation-conversion processed in the LUT 1 and the LUT 2, a non-linear gamma process set for each color is executed in a printer gamma LUT 107 in accordance with a printer output characteristic.

A pulse width modulation circuit 108 performs a pulse width modulation by comparing each of the input digital C, M, Y and Bk density signals with a predetermined triangle wave, independently, to convert into analog C, M, Y and Bk density signals. Then, the analog C, M, Y and Bk density signals are output to corresponding color parts of the LD driver 109, respectively.

The LD driver 109 forms a latent image on a photosensitive drum in the electrophotographic method, on the basis of the input analog C, M, Y and Bk density signals.

It should be noted that the CPU 110 controls the foregoing each circuit on the basis of a program stored in a ROM 111, by using a RAM 112 as a work-memory.

Next, the gradation conversion process of the LUT 1 and the LUT 2 in the transparent recording medium mode and the normal mode will be described.

(I) Transparent Recording Medium Mode

Figure 3:
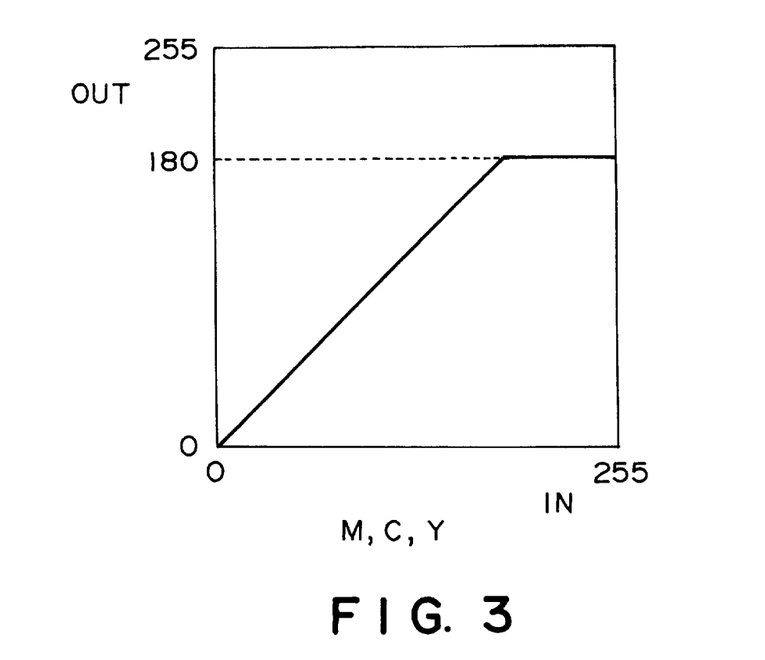
FIG. 3 shows a gradation conversion characteristic of M, C and Y.
Figure 4:
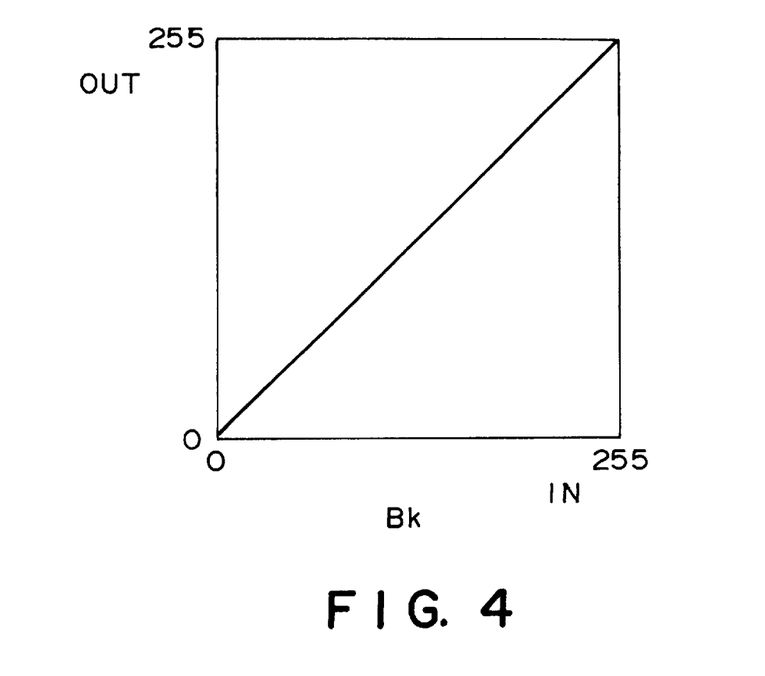
FIG. 4 shows a gradation conversion characteristic of Bk.

A conversion characteristic in the transparent recording medium mode is indicated by FIGS. 3 and 4.

FIG. 3 indicates the conversion characteristic of the gradation conversion process of the LUT 1 circuit 106a, and FIG. 4 indicates the same as that of the LUT 2 circuit 106b.

As shown in the drawings, the Bk signal has the conversion characteristic for outputting the input signal as it is, while the signals of M, C and Y are set to limit the output signal not exceeding the level 180.

The reason for setting like this will be described hereinafter.

Figure 5:
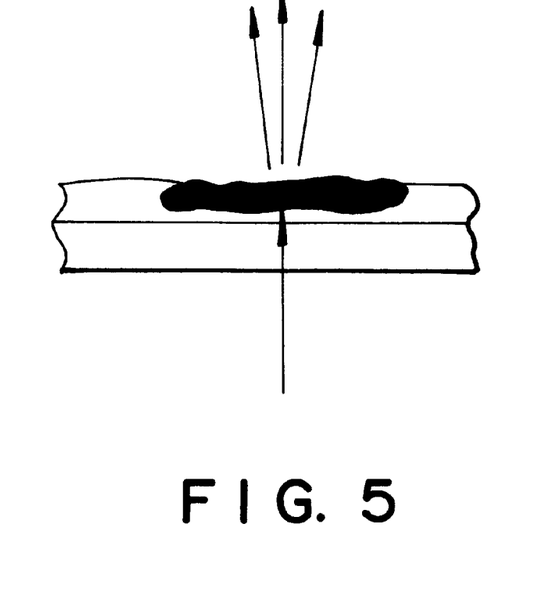
FIG. 5 is a cross-sectional view of an OHP sheet in case where it is sufficiently fixed.
Figure 6:
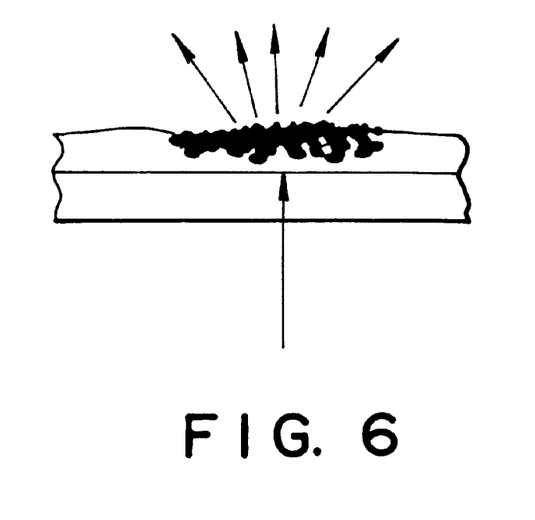
FIG. 6 is a cross-sectional view of an OHP sheet in case where it is fixed with the safety fixing speed.

FIGS. 5 and 6 are cross-sectional views in a case where an image is formed on a transparent recording material.

FIG. 5 indicates the state that an image is sufficiently fixed under the condition that a fixing temperature is set at 160° C. and a fixing speed is set at 25 mm/sec. In this case, toner grains are sufficiently fused and dispersed in the recorded image holding layer without having the grain shape, and the diffusion of the transmitting light can not be almost observed.

In such a state, a hue of the image projected to a screen by utilizing an OHP sheet on which the image is formed by color toners of M, C and Y is clear, and the image having excellent color productivity can be obtained.

However, if the fixing speed is set more slowly than that of ordinary case in order to set the fixing speed suitable for the transparent recording medium, it is appeared an area at which a pulse motor cannot uniformly be driven. Further, since heat to be given to a PET sheet becomes unexpectedly large, the transparent recording sheet passes through feed rollers 81 in a thermoplastic state after passing through the fixing roller. As a result, there occurs such a defect as the surface of a transparent recording sheet becomes worse. Further, probability that the fused toner adheres to the fixing roller becomes large in an area where a great deal of toner is transferred at a high concentration (or density) area of an image. Therefore, there occurs such an image defect as the density of the high concentration (or density) area becomes low. Moreover, due to tackiness of the fused toner, a serious damage will be occurred in the image forming apparatus, this fact may become the fatal defect for the image forming apparatus.

FIG. 6 indicates the state of being executed the fixing under the condition that a fixing temperature is set at 160° C. and a fixing speed is set at 75 mm/sec to avoid the above fatal defect.

In this case, the toner grains are not sufficiently fused because of the insufficient heat, and a toner's grain structure is partially remained. Due to this fact, the incident light is diffused, and the hue of the projected image utilizing the OHP sheet with color toners of M, C and Y becomes hardly diffused as the quantity of toner grows large. As a result, the color of muddy black is appeared.

Figure 7:
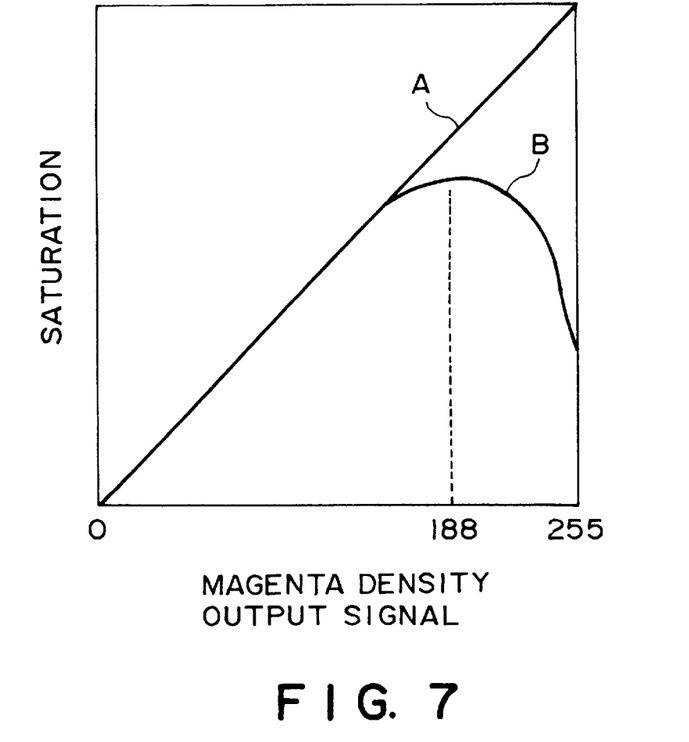
FIG. 7 shows a characteristic of the relationship between a density output signal of magenta and the saturation.

FIG. 7 shows the characteristic of the relationship between a density output signal and saturation. In FIG. 7, A indicates the characteristic when the fixing speed is set at 25 mm/sec, and B indicates the characteristic when the fixing speed is set at 75 mm/sec.

According to a curve indicated by B, it is understood that blur (or muddiness) is appeared from about 180 level in the density output signal value.

That is, as described above, it is understood that the toner grains are not sufficiently fused because of the insufficient heat.

As above, in case of utilizing the transparent recording medium, a large heat is required in order to fuse the toner grains as compared with the case of utilizing an ordinary sheet.

However, if the fixing speed is delayed in order to give the sufficient heat capacity, there occurs the above-mentioned problems.

While, even if the fixing temperature is increased, such another problem as the state of thermoplasticity or the like will be occurred.

Therefore, in the present embodiment, as apparent from FIG. 7, the quantity of toner has to be limited such that the toner grains can be sufficiently fused under the normal fixing temperature and speed in the transparent recording medium.

That is, as to the chromatic components of M, C and Y, even if a density input signal exceeding the level 180 exists, as shown in FIG. 3, the quantity of toner has to be limited such that an upper limitation does not exceed the level 180.

In the present invention, in consideration of a total image quality, an image having no extraordinary impression can be formed by avoiding the generation of blur (or muddiness).

While, as to the achromatic component of Bk, character information becomes important at a level exceeding the level 180 in the character reproduction quality, and the probability that the level of Bk does not exceed the level 180 is extremely large in a gradation image area due to the UCR processing when an image is in the normal state. In this point of view, it is not required to set any limitation for the component Bk.

As described above, in the transparent recording medium mode, the quantity of toner is limited such that the toner can be fused under the heat capacity to be given by the normal fixing temperature and speed.

Further, as to the achromatic component of Bk, since reproductivity with the high level becomes important in black characters or the like, it is not required to limit the achromatic component of Bk but is required to limit the chromatic components of Y, M and C.

Accordingly, the blur (or muddiness) in color can be prevented, the color can be reproduced clearly, and the black character can be reproduced excellently.

(II) Normal Mode

In a case where a normal mode is designated, an image can be excellently reproduced until the high density portion, at the normal fixing speed and temperature.

Therefore, the quantity of toner has not to be limited at the LUT 1, but the gradation conversion process shown in FIG. 4 has to be executed for entire colors of C, M, Y and Bk.

That is, for the LUT 1 and the LUT 2, a gradation conversion table shown in FIG. 4 has to be set.

As described above, according to the present embodiment, the most suitable process in accordance with the kind of the recording medium can be executed.

By providing the above setting, as to an image projected by the OHP, especially by a reflective type OHP, an excellent quality can be obtained.

Second Embodiment

In the first embodiment, the most suitable state can be realized for the case where an image is projected by, especially, the reflection-type OHP.

However, in a case where an image is projected by a transmission-type OHP, the color may be observed thin in an OHP image formed under the condition of the first embodiment.

Figure 8:
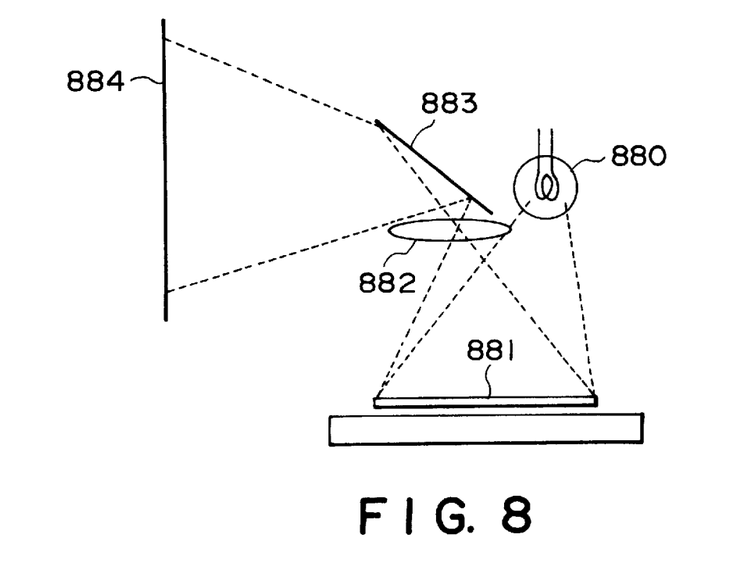
FIG. 8 is a structural view of a reflection-type OHP.
Figure 9:
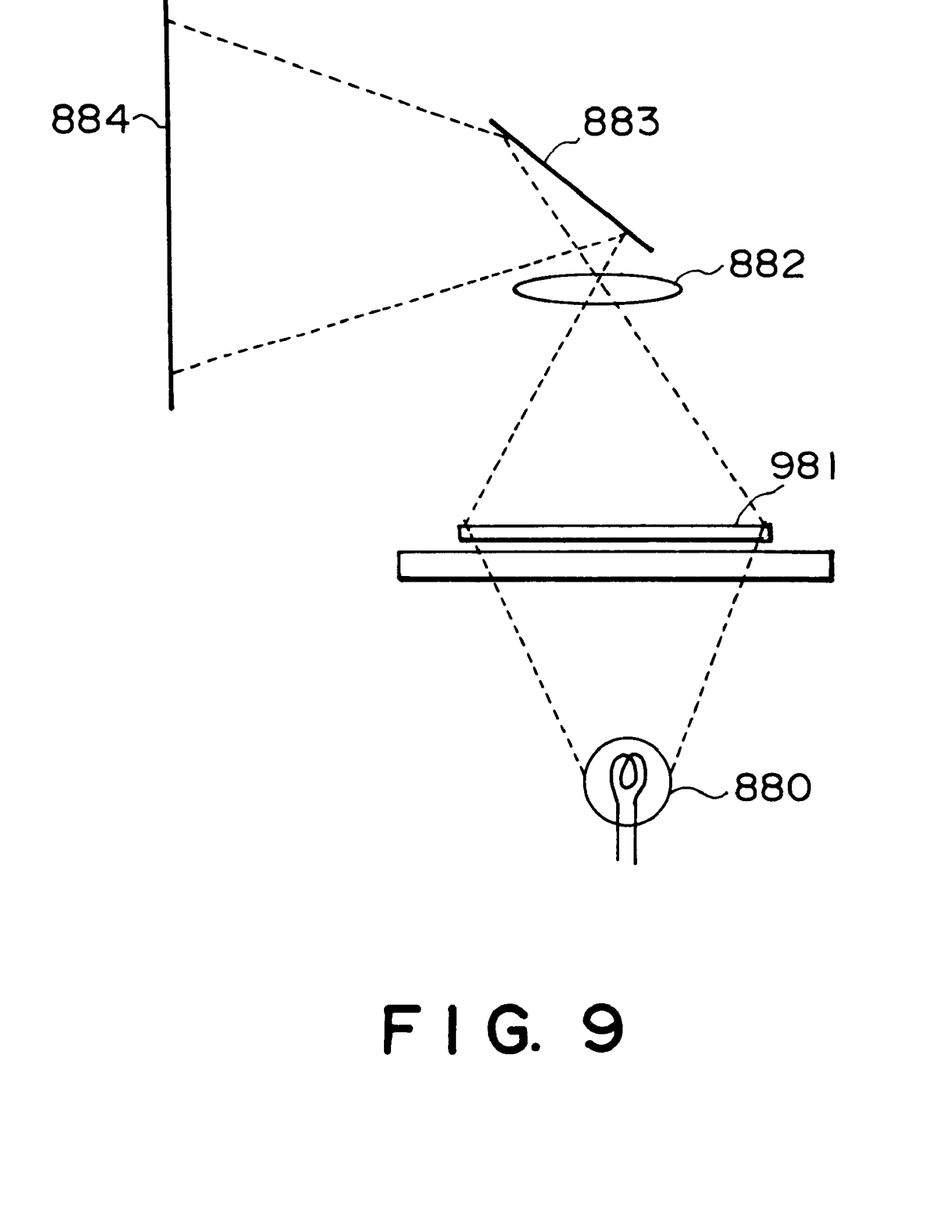
FIG. 9 is a structural view of a transmission-type OHP.

FIG. 8 is a structural view of the reflection-type OHP and FIG. 9 is a structural view of the transmission-type OHP.

In the reflection-type OHP shown in FIG. 8, a light source 880 irradiates an OHP original 881, and the reflected light is projected on a screen 884 via a lens system 882 and a mirror 883.

In this case, since the light passes through the OHP original two times, the light is also shielded and diffused respectively two times. This fact causes a great loss of the light until reaching to a screen.

On the other hand, in a case where a transmission-type OHP is used, since the light passes through an OHP original 981 only one time, resulting in a little loss of the light.

Therefore, in a case where a transmission-type OHP is used, since the loss of light is relatively small, it is almost needless to notice a color blur (or muddiness). Accordingly, the process having an importance on reproducing the color deeply is executed.

Figure 10:
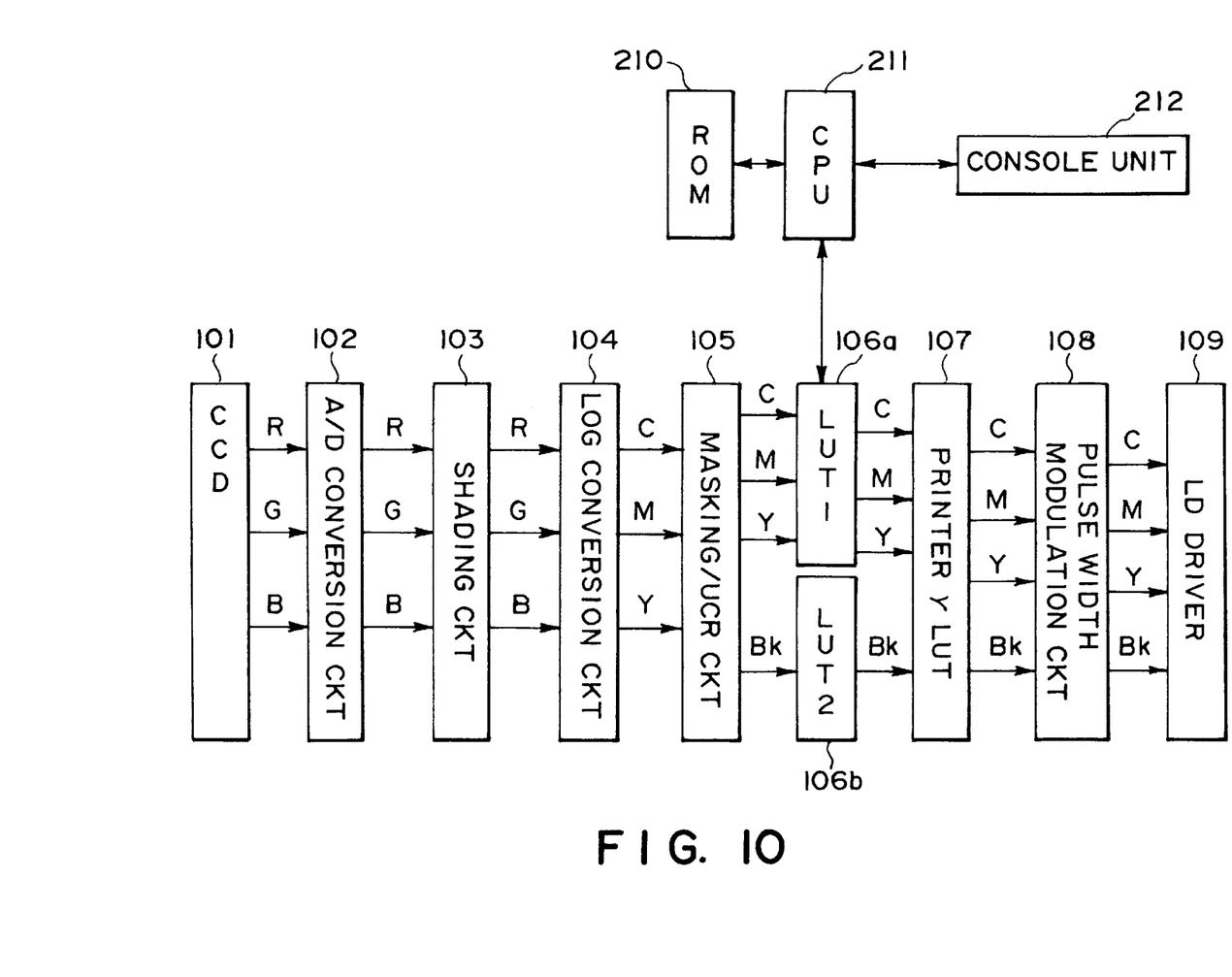
FIG. 10 is a block diagram showing a structural example of an image forming apparatus according to the second embodiment.
Figure 16:
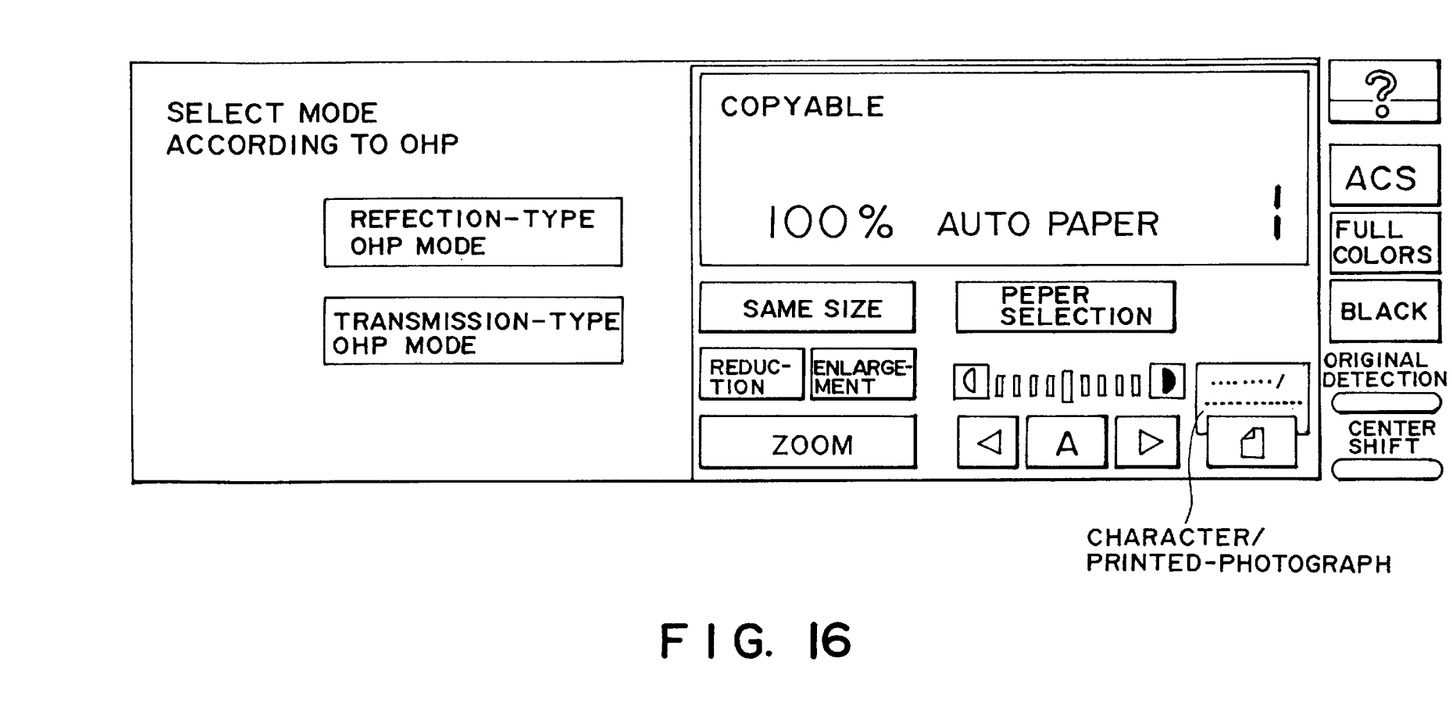
FIG. 16 shows an example of a console unit.

Therefore, in the present embodiment, as shown in FIG. 10, the most suitable condition fitting to the different type of OHP is registered in a ROM 210 for being selected by an user with a display screen of a console unit 212 shown in FIG. 16, and a CPU 211 loads the LUT value to be switched the parameter.

As a definite parameter of the transmission-type OHP, the gradation conversion characteristics of M, C and Y are set to the same as that of black Bk shown in FIG. 4.

Accordingly, the most suitable OHP sheet can be provided in accordance with the kind of OHP which is often used by an user.

Here, the description is given by utilizing only two modes, however, it is needless to say that the most suitable condition corresponding to the used OHP can be selected by varying the limiting value on a console unit.

Further, it is effective to modify the gradation conversion characteristic to a non-linear curved shape.

Further, the combination of the gradation conversion characteristic to be set in a LUT 1 and a LUT 2 may be such combinations as shown in FIGS. 12 to 15.

Figure 12:
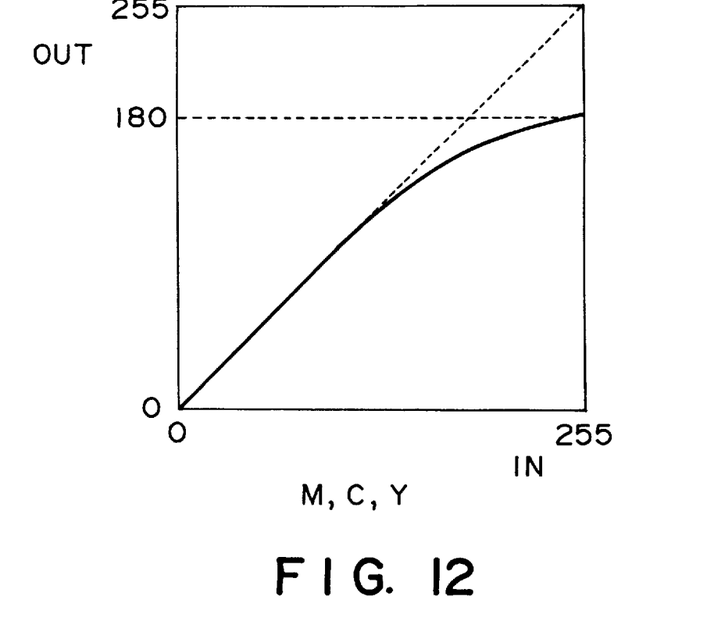
FIG. 12 shows a modified example of the gradation conversion characteristic of M, C and Y.
Figure 13:
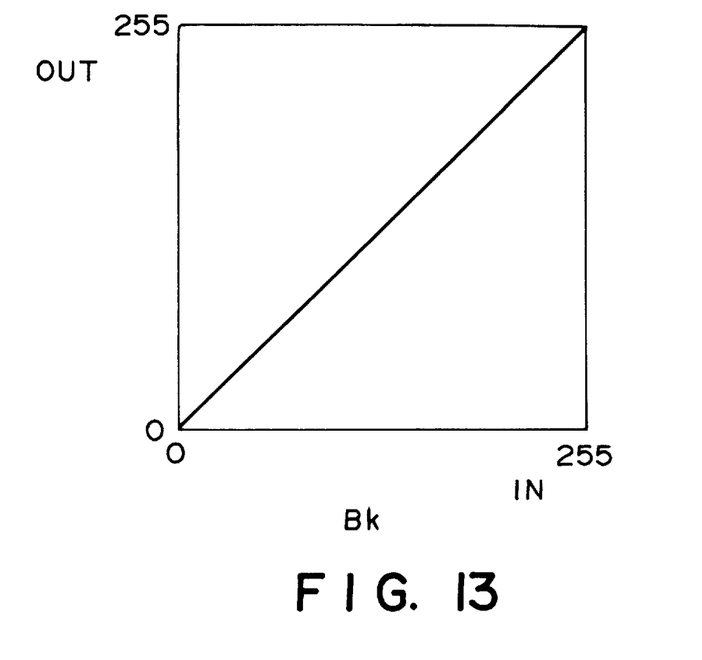
FIG. 13 shows a modified example of the gradation conversion characteristic of Bk.
Figure 14:
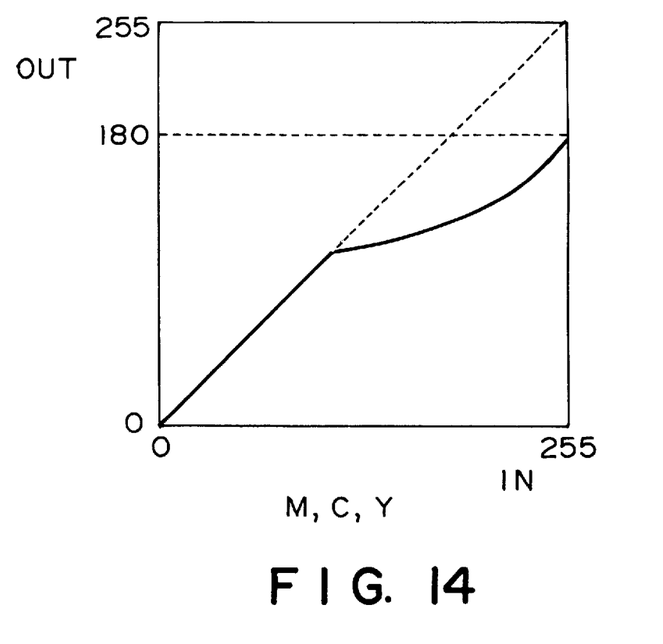
FIG. 14 shows a second modified example of the gradation conversion characteristic of M, C and Y.
Figure 15:
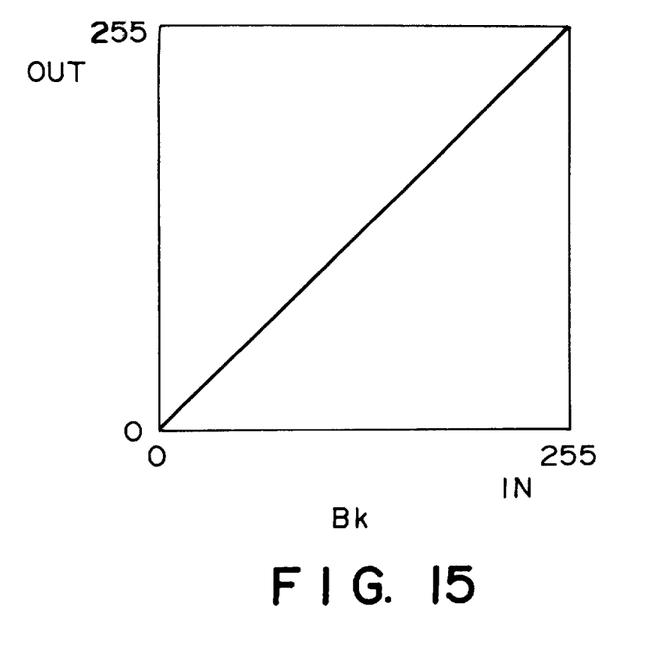
FIG. 15 shows a second modified example of the gradation conversion characteristic of Bk.

That is, a non-linear gradation conversion characteristic is set for the LUT 1 so that an excellent gradation may be maintained until the input level 255.

A printer gamma LUT 107 may be properly set to be corresponded to the varying of the output characteristic of a printer according to a calibration or the like.

The LUT 1 and the LUT 2 may be set so that the CPU controls and corrects the foregoing gradation conversion characteristic which is set with the mode corresponding to the foregoing recording medium for setting a table on the basis of the color-balance set by a console unit or the kind of images (characters, photograph or map).

Third Embodiment

In the above described embodiment, the most suitable OHP image was obtained utilizing the gradation conversion of a gamma LUT, however, in the present embodiment, it is characterized that a desired characteristic can be obtained by a color space conversion.

Figure 11:
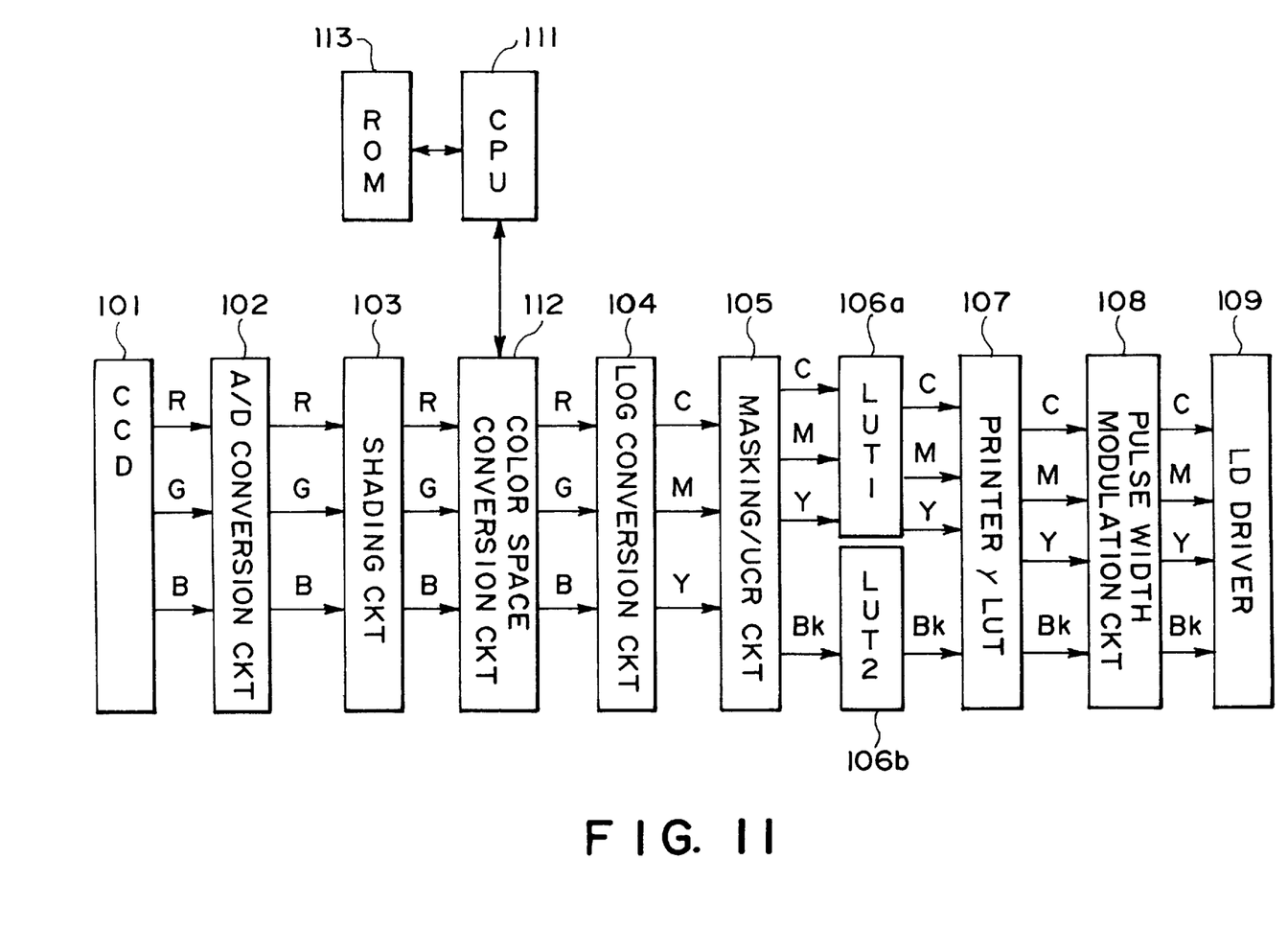
FIG. 11 is a block diagram showing a structural example of an image forming apparatus according to the third embodiment.

FIG. 11 is a block diagram of the third embodiment.

As shown in FIG. 11, a color space conversion circuit 112 is provided between a shading circuit 103 and a LOG conversion circuit 104.

Here, the present embodiment is supported by the following matrix calculation, and for an entire color space, the luminocity, the hue and the saturation can be controlled depending on the parameter of a matrix.

$$\begin{bmatrix} R' \\ G' \\ B' \end{bmatrix} = \begin{bmatrix} a1 & a2 & a3 & R \\ a4 & a5 & a6 & G \\ a7 & a8 & a9 & B \end{bmatrix}$$

If the OHP mode is selected, the same effect as that of the first embodiment can be obtained under the setting of without using the high-density to increase the luminocity.

As described above, according to the present invention, when an image is formed on a transparent recording medium, the image signal with the different image signal forming condition depending on the image signal process means is to be output against a black image signal portion and a color image signal portion, respectively, and the image forming means forms a color image on the transparent recording medium utilizing plural color materials on the basis of the image signal. This formed image can be projected as a full-color image having excellent colors by an image projector (OHP).

Further, depending on the constitution that a control means stores a mode setting the most suitable image signal forming condition against the kind of an image projector and such a mode can be selected by an user, an image to be projected with an excellent color-tone/density full-color image corresponding to the kind of OHP can be easily formed for an user who utilizes several kinds of OHPs.

As above, the description was given based on the preferable embodiments, however, the present invention is not limited to the foregoing embodiments but many modifications and variations are possible within the spirit and scope of the appended claims of the invention.

What is claimed is:

1. An image processing apparatus comprising:

input means for inputting color image data comprising plural color components; and color correction means for performing color correction in accordance with one of plural modes that correspond to recording media, the plural modes including a transparent recording medium mode and an ordinary sheet mode;

wherein, in the transparent recording medium mode, the color correction means performs color correction to limit an output level of a predetermined color component such that a quantity of recording material used for image formation is reduced relative to a quantity of recording material used for image formation in the ordinary sheet mode.

2. An apparatus according to claim 1, wherein the plural color components comprise a chromatic component and an achromatic component.

3. An apparatus according to claim 2, wherein the predetermined color component is a chromatic component.

4. An apparatus according to claim 1, wherein the color correction performed by said color correction means comprises gradation correction.

5. An apparatus according to claim 4, wherein gradation correction to clip the input equal to or larger than a predetermined value is performed on the predetermined color component.

6. An apparatus according to claim 4, wherein the gradation correction for the predetermined color component is non-linear.

7. An apparatus according to claim 1, further comprising:

generation means for generating the color image data by scanning an original image; and image formation means for forming an image on a transparent recording medium on the basis of color image data which has been color corrected.

8. An apparatus according to claim 1, wherein said color correction means performs a color space conversion.

9. An image processing apparatus comprising:

input means for inputting color image data which indicates a target image; and color correction means for performing a color correction of the color image data to form an image on a transparent recording medium, wherein said color correction means performs the color correction corresponding to a kind of a projector to be used for projecting the transparent recording medium.

10. An image processing method comprising:

an input step of inputting color image data comprising plural color components;

a color correction step of performing color correction in accordance with one of plural modes that correspond to recording media, the plural modes including a transparent recording medium mode and an ordinary sheet mode;

wherein, in the transparent recording medium mode, the color correction step performs color correction to limit an output level of a predetermined color component such that a quantity of recording material used for image formation is reduced relative to a quantity of recording material used for image formation in the ordinary sheet mode.

11. An image processing method comprising:

an input step of inputting color image data which indicates a target image; and a color correction step of performing a color correction of the color image data to form an image on a transparent recording medium, wherein, in said color correction step, the color correction corresponding to a kind of a projector to be used for projecting the transparent recording medium is performed.

* * * * *